Patented Oct. 20, 1931

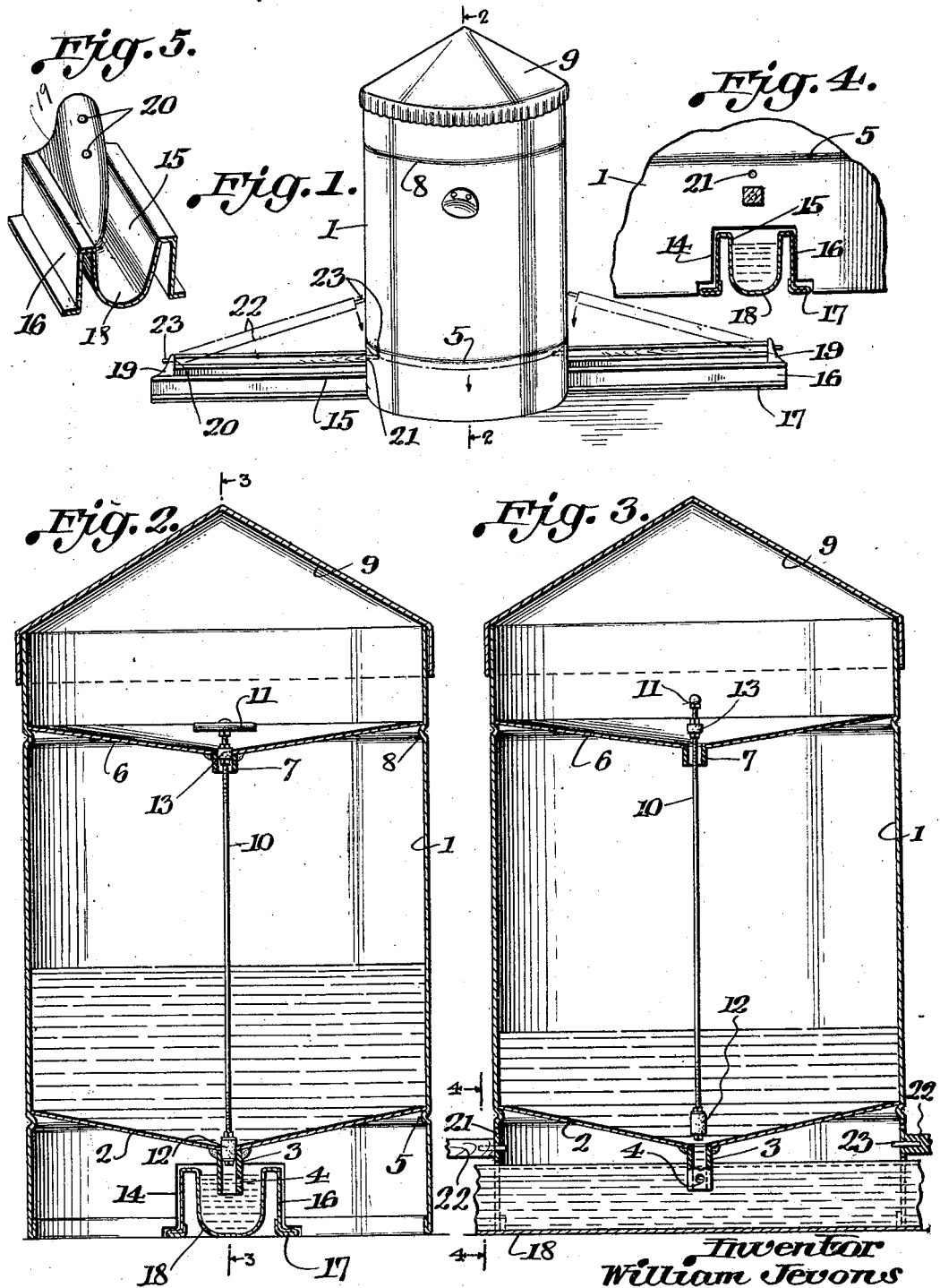

1,828,048

UNITED STATES PATENT OFFICE

WILLIAM JEVONS, OF WAKEFIELD, KANSAS

BABY CHICK WATERER

Application filed April 11, 1927. Serial No. 182,813.

This invention relates to a specific container for water or other liquids and a trough associated therewith which is devised for the purpose of providing an accessible supply of water for little chickens. The construction is such that the chickens cannot get into the trough which will contain a constant supply of fresh water.

Further objects of the invention will be apparent from the following detailed description and will be set forth in the appended claims.

Figure 1 is a perspective view of the tank and trough in operative position.

Figure 2 is a vertical section on the line 2—2 of Figure 1.

Figure 3 is a vertical section on the line 3—3 of Figure 2.

Figure 4 is a vertical section on the line 4—4 of Figure 3.

Figure 5 is an end view of the trough.

The tank 1 is preferably cylindrical in shape and is made of sheet metal and provided with a bottom 2 which is located considerably above the bottom of the walls of the tank 1 and is of inverted cone shape. At the lowest or central point it is provided with an opening in which is fastened a short pipe 3 which has an outer open end and also a small opening 4 in the side thereof. This bottom 2 is supported in position on an internal rib 5 of the tank 1. An internal top member 6 is of the same form as the bottom 2 and having a pipe 7 is supported on an internal rib 8 formed in the wall of the tank. The tank may be provided with a cover 9 of any suitable or desired form.

A valve stem 10, which is screw threaded at points adjacent its upper and lower ends is provided at the upper end with a handle 11 and at the lower end with a valve member 12 of any suitable material which is adjustable in position by means of nuts or similar members, screw threaded on the rod 10. Near the upper end the valve stem carries a valve member 13 which is adjustably mounted on the rod 10 in similar manner. The valve members 12 and 13 respectively are designed to close the central openings of the bottom 2 and top 6 respectively.

At diametrically opposite points the lower part of the tank wall, below the bottom 2, is provided with a substantially rectangular cut-out portion 14 having notches at its lower corners. These openings are for the purpose of enabling the tank 1 to be set over the trough member 15. This trough member is formed of a single piece of sheet metal, the form of which is best shown in Figures 2 and 4. There are side portions 16, which are substantially vertical and each of which is turned outwardly at its lower end and bent back upon itself to form supporting members 17. The trough member proper 18 is U-shaped and the walls are spaced slightly from the walls 16. The ends 19 of the trough are formed by bending up the metal to form upstanding projections which are provided with openings 20.

When the trough is in position the pipe 3 will dip down into the water in the trough which will rise to a point high enough to cover the opening 4 and the supply in the trough will be replenished as it is drawn down to the level of this opening. The tank may of course be filled by opening the valve 13 and pouring water upon the top member 6. Both pipes 3 and 7 may be closed or opened simultaneously or by proper adjustment of the valve members 12 and 13; either pipe may be closed while the other is open.

In order to position the trough against accidental displacement relative to the tank and also for the further purpose of preventing chickens or larger fowls getting into the trough, there are provided at each side openings 21 in the wall of the tank below the bottom 2 thereof and just above the trough. Pieces of wood 22 or similar material are provided at their ends with pins 23. When these wooden members are placed in position the pin 23 at the outer end enters the opening 20 in the end of the trough, while the pin 23 at the inner end enters one or the other of the openings 21 in the tank wall. If this pin is placed at the upper opening, a somewhat larger space is left between the wooden member and the water of the tank. These members will prevent the chickens from getting into the trough and will also retain the tank and trough in proper relation to each other.

It will be obvious that the precise details of construction may be varied quite widely in many ways and that the material and exact form of the various elements may be changed without in any way departing from the spirit of the invention which is to be regarded as limited only by the scope of the appended claims.

I claim as my invention:

1. A watering device comprising a trough, a tank separate from the trough having a supporting base straddling the trough, means for the discharge of water from the tank to the trough, said trough being of a length to extend outwardly beyond the base at opposite locations, and means located between the base and opposite ends of the trough relatively positioning the trough underneath the tank.

2. A watering device comprising a tank having a supporting base, a trough separate from the base and interfitted with the lower portion thereof, each outer end portion of the trough projecting beyond the base, and means disposed over said trough to serve as guards, to relatively position the base tank and trough, and means for the discharge of water from the tank to the trough.

3. A watering device comprising a trough, a tank separate therefrom having a bottom wall extending across the trough, means for the discharge of water from the tank through said bottom wall to the trough, said tank having a supporting base provided with a cut out open at the lower edge of the base through which the trough passes to enable the base and trough to rest on a common support, said trough extending outwardly beyond the tank, and a bar disposed over the trough outwardly of the tank to serve as a guard.

4. A watering device comprising a trough, a tank separate therefrom having a bottom wall extending across the trough, means for the discharge of water from the tank to the trough, said tank having a supporting base, said base and trough being in interfitted relation to enable them to rest on a common support, said trough extending outwardly beyond the tank, a bar disposed over the trough outwardly of the tank, said bar detachably engaging a hole in the base and a hole in the trough to relatively position the base tank and trough.

5. A watering device comprising a trough, a tank separate therefrom having a bottom wall extending across the trough, means for the discharge of water from the tank to the trough, said tank having a supporting base, said base and trough being in interfitted relation to enable them to rest on a common support, said trough extending outwardly beyond opposite portions of the base, bars disposed over the trough between the outer ends of the latter and the base, said trough and base having a plurality of openings engageable selectively by said bars to detachably position the trough, base and tank and also to vary the extent of the space permitting access to the contents of the trough.

In testimony whereof, I have hereunto subscribed my name.

WILLIAM JEVONS.